United States Patent [19]

De Busscher et al.

[11] 4,146,038
[45] Mar. 27, 1979

[54] STONE TRAP FOR HARVESTER

[75] Inventors: Cyriel R. J. De Busscher, Sijsele; Marcel A. Dekeyzer; Marc E. Ramon, both of Brugge, all of Belgium

[73] Assignee: Sperry Rand Corporation, New Holland, Pa.

[21] Appl. No.: 789,178

[22] Filed: Apr. 20, 1977

[30] Foreign Application Priority Data

May 1, 1976 [GB] United Kingdom .............. 17884/76

[51] Int. Cl.$^2$ ...................... A01F 12/20; A01D 75/18
[52] U.S. Cl. ................................................. 130/27 JT
[58] Field of Search .................... 130/27 R, 27 JT; 56/14.6, 122-125

[56] References Cited

U.S. PATENT DOCUMENTS

| 2,652,677 | 9/1953 | Krause et al. | 56/123 |
| 3,124,138 | 3/1964 | Claas | 130/27 JT |
| 3,209,759 | 10/1965 | Collins et al. | 130/27 JT |
| 3,576,188 | 4/1971 | Janis | 130/27 JT |
| 3,756,248 | 9/1973 | Mathews | 130/27 JT |
| 3,771,530 | 11/1973 | Wassell | 130/27 JT |

FOREIGN PATENT DOCUMENTS

| 906866 | 8/1972 | Canada | 130/27 JT |
| 2024706 | 5/1970 | Fed. Rep. of Germany | 130/27 JT |
| 2122402 | 5/1973 | Fed. Rep. of Germany | 130/27 JT |
| 1482940 | 1/1974 | Fed. Rep. of Germany | 130/27 JT |

Primary Examiner—Russell R. Kinsey
Attorney, Agent, or Firm—John B. Mitchell; Frank A. Seemar; Ralph D'Alessandro

[57] ABSTRACT

The invention relates to combine harvesters having stone traps for collecting stones and other foreign objects before they reach the threshing means of the harvesters and enabling the trapped stones to be easily removed from the harvesters. A combine harvester according to the present invention comprises a crop elevator having a rear discharge end, threshing means including a rotatable cylinder and a cooperable concave forming a nip therebetween; the nip being spaced rearwardly of the discharge end to define an opening directed downwardly to a stone trap having a lower wall extending downwardly and forwardly to a forward edge; the stone trap having an outlet closable by a door which is pivotally mounted on the forward edge and which, in a closed position thereof, seals against an underside surface of the crop elevator, the crop elevator being capable of adopting an operative position in which the forward edge of the stone trap is disposed beneath the elevator and in which the stone trap extends forwardly of and beneath the discharge end of the elevator.

11 Claims, 7 Drawing Figures

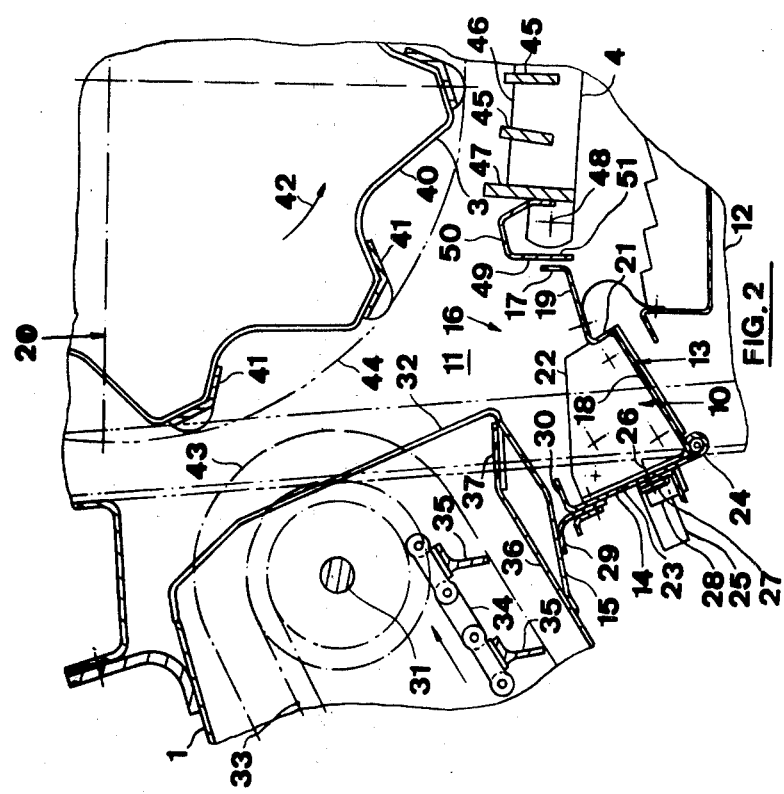

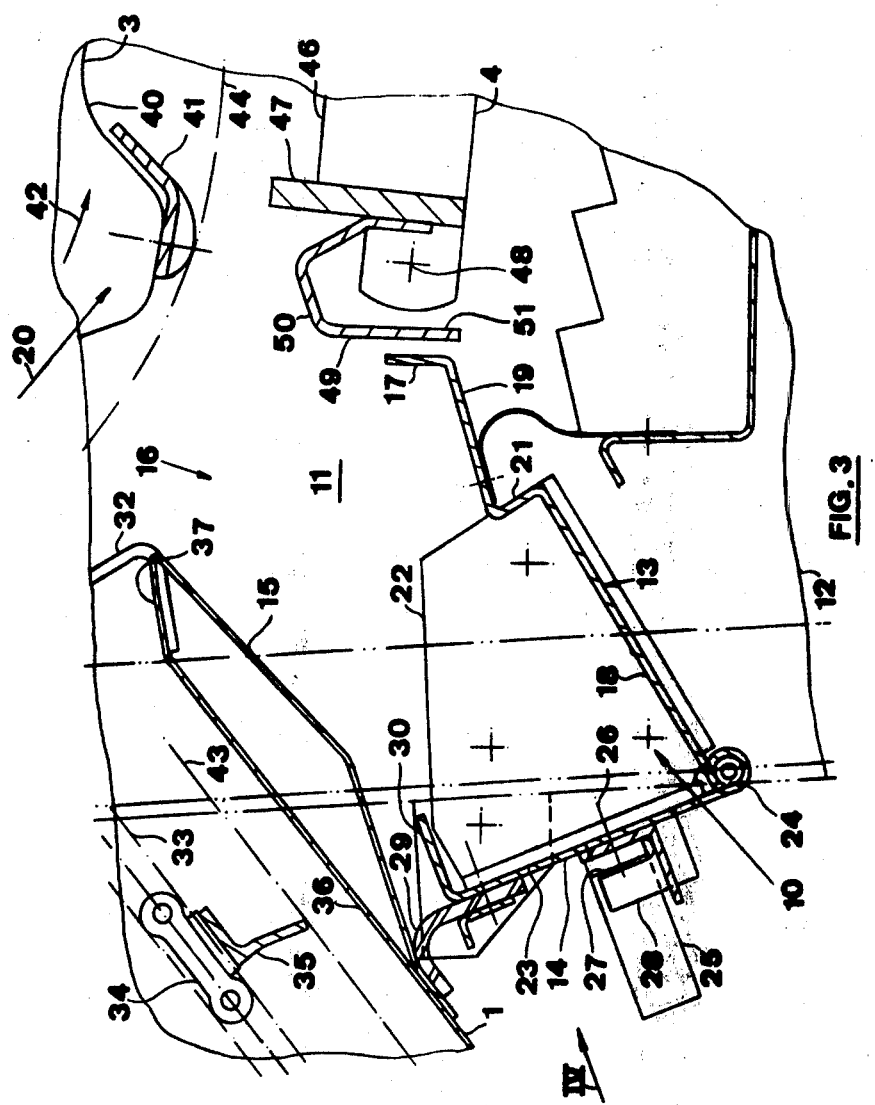

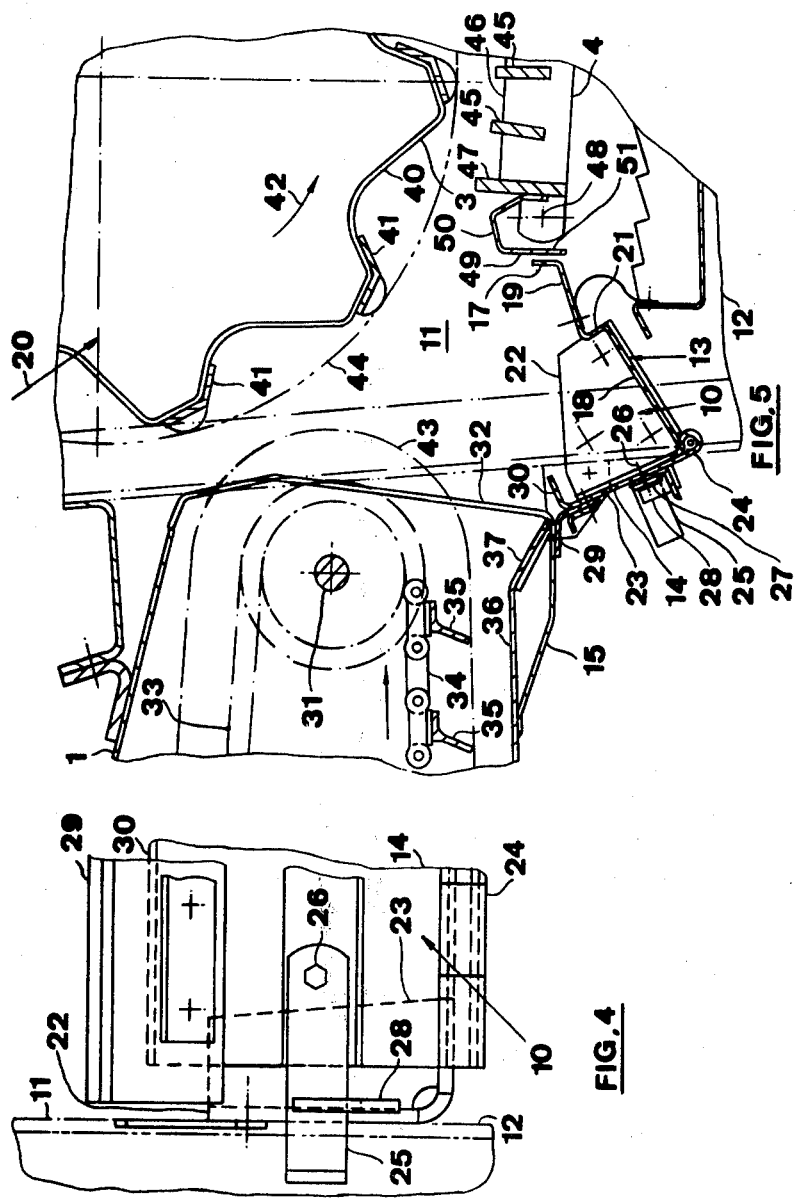

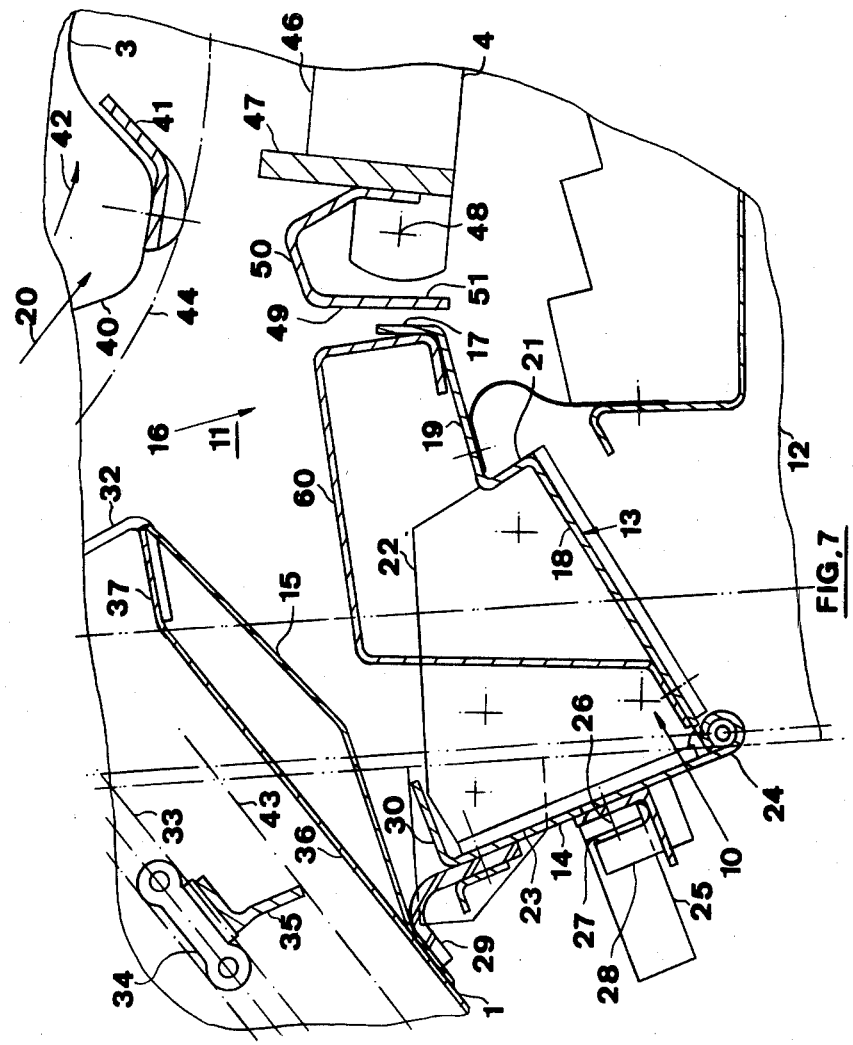

STONE TRAP FOR HARVESTER

BACKGROUND OF THE INVENTION

1. Field of the Invention

The present invention relates to combine harvesters having stone traps for collecting stones and other foreign objects before they reach the threshing means of the harvesters and enabling the trapped stones to be easily removed from the harvesters.

2. Description of the Prior Art

When harvesting windrow crops with a pick-up attachment mounted on a header of a combine harvester, or when cutting the crops close to the ground surface with a direct-cut attachment, stones and other hard foreign objects are frequently picked-up and fed into the harvester. To avoid damage caused by stones, combine harvesters commonly have trough-shaped stone traps disposed forwardly of the threshing means. Stones which are fed towards the threshing means are hit by threshing bars of the threshing means and thereby thrown into the trap.

However, small trough-shaped stone traps are not fully adequate for retarding all stones which are likely to cause damage. Larger stone traps may be fully adequate for retarding the stones, but may also adversely influence the fluent transition of crop material from a crop elevator of the harvester to the threshing means. This decreases the efficiency of the harvester.

One attempted solution according to U.S. Pat. No. 3,209,759 has been to provide a feeder beater above a large stone retarder. However, this results in higher cost of the harvester. Moreover, the header, together with the crop elevator, have to be mounted further to the front to accomodate the feeder beater. This reduces the fore-and-aft stability of the harvester.

Another attempted solution according to U.S. Pat. No. 2,652,677 is to provide a transition plate between the crop elevator and the threshing means. The transition plate is held in an operative position relative to the threshing means by spring biased latches but, in response to a pre-determined abnormal pressure, is released and undergoes pivotal movement. However, the adjustment of traps having such transition plates has proved very difficult and the operator must be alert to determine when the trap opens.

SUMMARY OF THE INVENTION

An object of the present invention is to provide a combine harvester having a fully effective stone trap without the need to provide any additional feeder means and yet which does not adversely influence the smooth flow of crop material from the elevator to the threshing means.

According to the present invention a combine harvester comprises a crop elevator having a rear discharge end, threshing means including a rotatable cylinder and a cooperable concave forming a nip therebetween, the nip being spaced rearwardly of the discharge end to define an opening leaning downwardly to a stone trap having a lower wall extending downwardly and forwardly to a forward edge, the stone trap having an outlet closable by a door which is pivotally mounted on the forward edge and which, in a closed position thereof, seals against an underside surface of the crop elevator, the crop elevator being capable of adopting an operative position in which the forward edge of the stone trap is disposed beneath the elevator and in which the stone trap extends forwardly of and beneath the discharge end of the elevator.

When the elevator is in the operation position, the discharge end is preferably spaced substantially vertically below a forward portion of the circle generated by the cylinder.

The crop elevator may have a base which extends upwardly and rearwardly when the elevator is in the operative position, at the rearward end the base having an angled portion providing an enlargement in the cross-sectional area of the passage for flow of crop material passing out of the discharge end of the elevator.

A rearward edge of the inlet opening is preferably defined by a transition plate positioned forwardly of the nip, the transition plate having an upwardly and rearwardly inclined guide surface for guiding crop material into the nip.

BRIEF DESCRIPTION OF THE DRAWINGS

A combine harvester according to the present invention will now be described in greater detail, by way of example, with reference to the accompanying drawings, in which:

FIG. 3 is a view similar to that of FIG. 2, but showing the crop elevator in an extreme lowered position, FIG. 4 is a fragmentary view as seen in the direction of the arrow IV in the FIG. 3, FIG. 5 is a view similar to that of FIG. 2, but showing the crop elevator in a raised inoperative position, FIG. 7 is a view similar to that of FIG. 3, but illustrating an optional feature of the combine harvester.

DETAILED DESCRIPTION OF THE INVENTION

IN GENERAL

Figure 1:
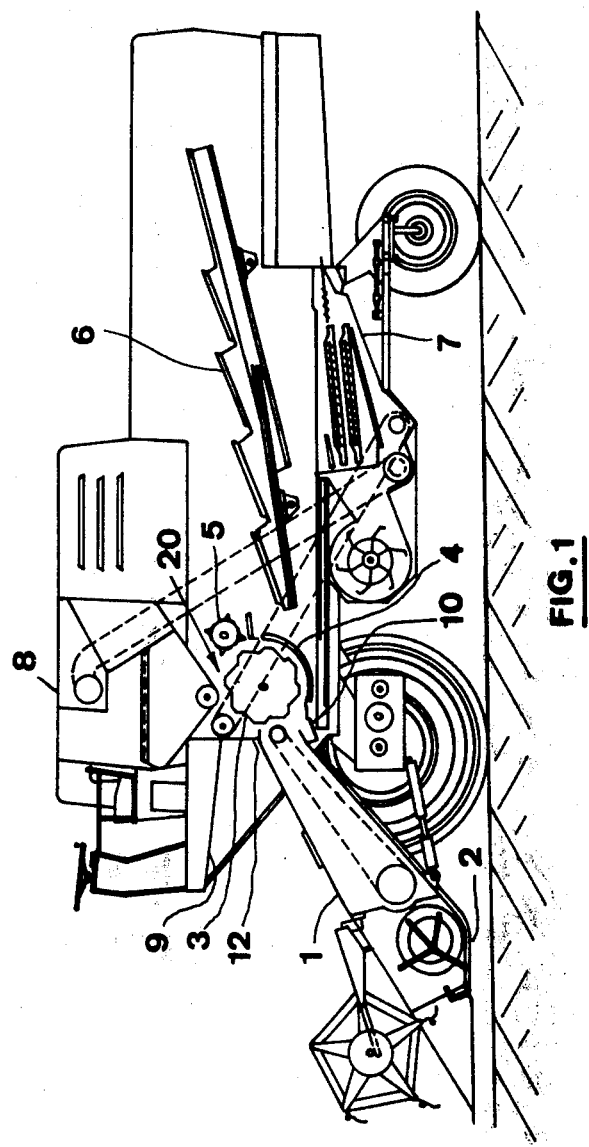
FIG. 1 is a schematic side view of the combine harvester with a crop elevator in an operative position, parts being cut away to show internal detail, FIG. 2 enlarged in scale, is a longitudinal sectional view, on an enlarged scale, of a part of the harvester of FIG. 1.

With reference to FIG. 1, the combine harvester comprises a crop elevator 1, the forward end of which supports a header 2. The crop elevator 1 transports cut crop material to threshing means 20 comprising a rotatable cylinder 3 and a cooperating concave 4, the latter sub-tending an angle of the order of 130° at the rotational axis of the cylinder 3. The combine harvester also comprises a conventional straw beater 5, straw walkers 6 and a cleaning device 7 for further treating the crop material and a grain tank 8 for storage of threshed and cleaned grain. The operator's platform with a steering column and controls is located in front of the grain tank 8 and is generally indicated at 9. A stone trap 10 is disposed forwardly of the nip between the concave 4 and the cylinder 3.

PREFERRED EMBODIMENT

With reference to FIG. 2, the stone trap 10 has side wall portions 11 (which are part of the harvester side walls 12), a generally forwardly and downwardly inclined lower wall 13, a front door 14 and an inlet opening 16. A bent plate 15 is secured on the underside of the elevator 1.

The wall 13 has a rear, upwardly bent flange 17, a front section 18 and a rear section 19. The front and rear sections 18 and 19 are interconnected by a step 21. The wall 13 is secured to the side walls 12 by mounting brackets 22 which provide front abutment edges 23 for the door 14. The shape of the wall 13 provides considerable strength.

The door 14 is hinged at its lower edge to the front edge of the wall 13 by hinges 24 and is arranged to abut the edges 23 when in its closed position in which it closes an outlet of the stone trap 10. When opened (FIG. 6), the door 14 is below the level of the front section 18. Latch plate 25 are pivotally mounted at 26 near the side edges of the door 14 and are arranged to hook in recesses 27 (FIG. 3) of brackets 28 (which are attached to the brackets 22) to hold the door 14 in its closed position. The door 14 carries a flexible sealing strip 29. A bent edge portion 30 on the door 14 is intended to give greater strength thereto.

The elevator 1 is pivotally mounted on the framework of the harvester at 31 so as to be movable between the positions shown in the drawings. The elevator 1 has a rear discharge end with a discharge opening 32 facing rearwardly towards the nip between the cylinder 3 and concave 4. A crop conveyor 33 comprising conveyor chains 34 with conveyor slats 35 secured thereto is arranged to move the crop material upwardly over the elevator base 36. The elevator base 36 has an angled portion 37 at its discharge end, the portion 37 providing an enlargement in the cross-sectional area of the crop material passage to promote smooth flow of crop material. The portion 37 is inclined at a smaller angle to the horizontal than the remainder of the base 36.

The plate 15 is secured to the underside of the base 36 at the discharge end thereof and, while this plate 15 is not fully arcuate, it is arranged to be generally concentric with the pivot axis 31 of the elevator 1. The sealing strip 29 seals against the plate 15 when the door 14 is in the closed position. The sealing strip 29 seals against the plate 15 irrespective of the angular position of the elevator 1 within its angular range of positions because of the shape of the plate 15.

The space between the discharge opening 32 of the elevator 1 and the threshing concave 4 constitutes the inlet opening 16 of the stone trap 10. When the header and the elevator 1 are in the normal operative position shown in FIG. 2 (in which the header 2 is spaced closely above the ground to receive crop material) the opening 16 is small.

The threshing cylinder 3 comprises flanges 40 and rasp bars 41 mounted thereon. The threshing cylinder 3 is rotated in the direction indicated by the arrow 42. The outlines 43 and 44 generated by conveyor 33 and the threshing cylinder 3 closely approach one another, as shown in FIG. 2.

The threshing concave 4 comprises transverse threshing bars 45 mounted in a frame with arcuate side members 46 and a front transverse bar 47. The concave 4 is adjustable in height relative to the threshing cylinder 3 for adjusting the clearance nip to suit the crop and the crop condition. The concave 4 is pivotally supported at its forward end at 48 (the rear suspension not being shown). A transition plate 49 having an upwardly and rearwardly slanting guide surface 50 is attached to the front transverse bar 47 of the concave 4 and is movable therewith. The transition plate 49 has a generally vertical front wall 51 which is positioned adjacent the flange 17 of the floor 13. The front wall 51 of the transition plate 49 is shifted generally parallel to the flange 17 during adjustment of the concave 4, thereby avoiding any jamming of crop material between the various components.

When the elevator 1 is in the operative position shown in FIGS. 1 and 2, the hinges 24 are disposed beneath the elevator 1 and the stone trap extends forwardly of and beneath the discharge end of the elevator 1. Also, the discharge opening 32 of the elevator 1 is at the same horizontal level as the nip between the cylinder 3 and concave 4.

OPERATION

In operation, the combine harvester is driven across the field with the elevator 1 and the header 2 mounted thereon in the operative position shown in FIGS. 1 and 2. Crop material is cut with a direct cut attachment or with a row crop attachment on the header and fed into the crop elevator 1. The elevator chain 34 with the conveyor slats 35 urges the layer of crop material upwardly over the elevator base 36 and towards the threshing means 20. The layer of crop material is engaged, shortly after leaving the discharge opening 32 of the elevator 1, by the rasp bars 41 which deflect the layer in a downward direction and into the nip between the threshing cylinder 3 and the threshing concave 4. The glide surface 50 assists in guiding the crop layer into the nip. The angled portion 37 of the elevator base 36 assists in providing a smooth transition from the elevator 1 to the threshing means 20. The risk of crop plugging in this area is therefore reduced to a minimum. The threshing means 20 and other crop treating means in the harvester operate under a generally constant load and at high efficiency because of the smooth flow of the crop layer.

The stone trap 10 will be filled up with chaff, short straw and grain soon after starting operation. This further enhances smooth flow of the crop layer over the stone trap. The material in the stone trap forms a soft mass for receiving stones and other hard foreign objects. Indeed, all stones and other hard foreign objects fed to the threshing means 20 are hit by the rasp bars 41 which revolve at high speed, whereby the stones or other hard objects are thrown towards and into the soft mass in the stone trap 10. With the stone trap 10 extending underneath the discharge end of the elevator 1, it thus has become possible to provide a large and hence very efficient stone trap for the reasons explained above, and yet to maintain a continuous and smooth flow of crop material from the elevator 1 to the threshing means 20. The design of the components of the harvester enables the header 2 and elevator 1 to be raised to inoperative transport position (FIGS. 5 and 6) without any squeezing of material in the stone trap 10 and without any aperture being formed between the elevator base 36 and the strip 29.

Adjustment of the concave 4 is easily possible without any squeezing or jamming of crop material between the various components as the wall 51 is arranged to move generally parallel to the flange 17.

Figure 6:
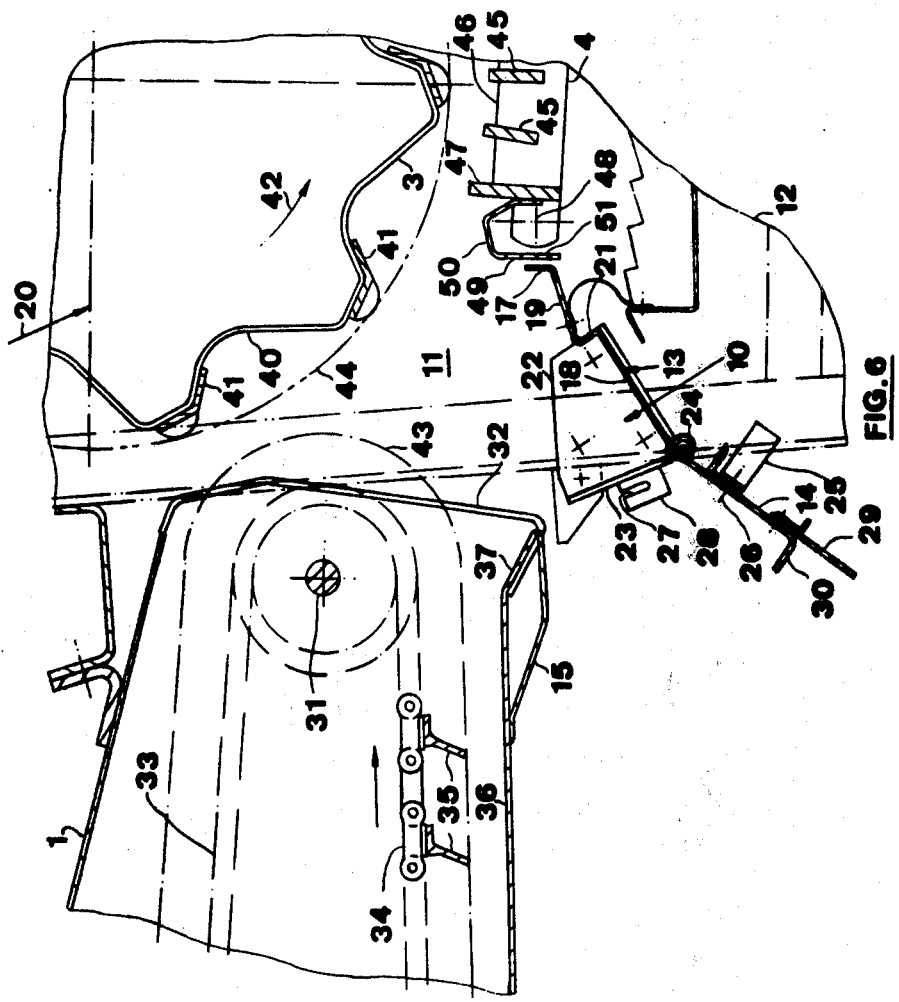
FIG. 6 is a view similar to that of FIG. 5, but showing a stone trap door of the harvester in an open position.

The stone trap 10 can easily be emptied and cleaned from below the elevator 1 by unlatching and opening the door 14 to the open position shown in FIG. 6. The door 14 also provides access to the transition area between the elevator 1 and the threshing means 20 for cleaning any plugging which might nevertheless occur.

The combine harvester shown in the drawings thus has a large stone trap without the necessity of an additional feeder beater, as has been common practice in the past. It will also be appreciated that the discharge end of the elevator base 36 together with the bent plate 15 form a strong structure which can resist normal forces acting thereon during operation.

For those situations where stones or other hard foreign objects are not likely to be encountered, e.g. because the crop (such as maize) is cut from the stubble at a substantial height above the ground, a filler plate 60 may be fitted in the stone trap 10, as shown in FIG. 7.

Having thus described the invention, what is claimed is:

1. A combine harvester comprising:
   a chassis;
   a crop elevator mounted on the chassis and pivotable between a raised inoperative position and a lowered operative position and having a bottom wall with a rear discharge edge;
   threshing means mounted on the chassis and having a rotatable threshing cylinder and a cooperable threshing concave forming an intake nip therebetween and at the forward end of the concave, the nip being spaced rearwardly of the bottom wall discharge edge to define therebetween an opening leading downwardly;
   a stone trap supported on the chassis within the downwardly leading opening and having a lower wall extending downwardly and forwardly to a forward edge, the fore-and-aft dimension of the stone trap exceeding substantially the fore-and-aft dimension of the downwardly leading opening when the elevator is in the operative position and the stone trap having an outlet at the forward edge;
   a door pivotally mounted on the forward edge for closing the stone trap, the door sealing against, the bottom wall when in a closed position, the forward edge of the stone trap being disposed beneath the elevator when the latter is in the operative position and the stone trap extending forwardly of and beneath the discharge edge of the elevator.

2. The combine harvester as recited in claim 1, wherein when the elevator is in the operative position, the discharge edge is spaced substantially vertically below a forward portion of the circle generated by the cylinder.

3. The combine harvester as recited in claim 1, wherein when the elevator is in the operative position, the discharge edge is provided substantially at the same level as the intake nip between the threshing cylinder and cooperable concave.

4. The combine harvester as recited in claim 1, wherein the elevator bottom wall extends upwardly and rearwardly when the elevator is in the operative position, and wherein the bottom wall comprises an angled portion providing an enlargement in the cross-sectional area of the passage for flow of crop material passing out of the discharge edge of the elevator.

5. The combine harvester as recited in claim 1, further comprising a transition plate supported on the chassis positioned forwardly of the intake nip, the transition plate defining a rearward edge of the opening and having an upwardly and rearwardly inclined guide surface for guiding crop material into the intake nip.

6. The combine harvester as recited in claim 5 wherein the transition plate is attached to the forward end of the concave for adjustment together therewith relative to the threshing cylinder.

7. The combine harvester as recited in claim 1 wherein the stone trap door comprises a flexible sealing strip for engaging the underside surface of the elevator throughout the range of pivotal movement of the elevator.

8. The combine harvester as recited in claim 7 wherein the underside surface of the elevator comprises a shaped plate for the sealing strip to seal against, the shaped plate being arranged such that it generally extends partially around the pivotal centre of movement of the elevator for effective sealing of the sealing strip against the shaped plate throughout the range of pivotal movement of the elevator.

9. A combine harvester comprising:
   a rotatable threshing cylinder generating a circle;
   a threshing concave mounted adjacent the threshing cylinder and cooperable therewith for threshing crop material, the threshing cooperable therewith for threshing crop material, the threshing cylinder and threshing concave forming an intake nip therebetween at the forward end of the threshing concave; the intake nip being positioned rearwardly of a forward portion of the circle generated by the threshing cylinder;
   a crop elevator forwardly of the threshing cylinder and threshing concave and capable of adopting an operative position in which the forward end of the elevator is lowered; the crop elevator having a bottom wall, and being operable to feed crop material upwardly over the bottom wall towards the intake nip, the bottom wall having a rear discharge edge which, when the elevator is in the operative position is spaced substantially vertically below a forward portion of the circle generated by the threshing cylinder and substantially horizontally forwardly of the intake nip, and
   stone trap means having a generally horizontally extending inlet between the discharge edge of the elevator bottom wall and the intake nip, and extending in a forward and downward direction substantially below and forwardly of the discharge edge of the elevator bottom wall, when the elevator is in the operative position, the fore-and-aft dimension of the stone trap exceeding substantially the width of the spacing between the bottom wall discharge edge and the intake nip.

10. The combine harvester as recited in claim 9, wherein the crop elevator is pivotally movable between an operative position in which the forward end of the elevator is lowered, and an inoperative position in which the forward end of the elevator is raised, and wherein the stone trap means further comprise:
    a lower wall extending forwardly to a forward edge, and
    a door pivotally mounted on the forward edge for closing the stone trap means, the door sealing against an underside surface of the elevator bottom wall throughout the range of pivotal movement of the elevator, when in a closed position.

11. The combine harvester as recited in claim 10, wherein the underside surface of the elevator bottom wall comprises first sealing means generally extending partially around the pivotal centre of movement of the elevator and wherein the door comprises further flexible sealing means engaging the first sealing means throughout the range of pivotal movement of the elevator for effective sealing therewith, when the door is in the closed position.

* * * * *